UNITED STATES PATENT OFFICE.

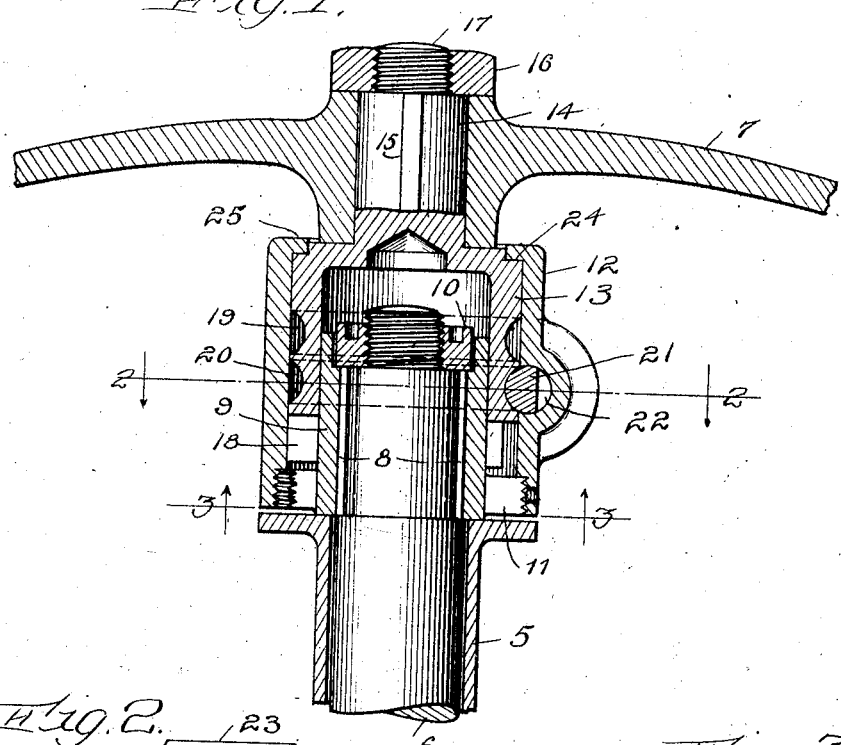
J. DE MARTINO.
MOTOR VEHICLE LOCK.
APPLICATION FILED OCT. 27, 1919.
1,333,581.
Patented Mar. 9, 1920.

JOSEPH DE MARTINO, OF CHICAGO, ILLINOIS, ASSIGNOR TO SIMPLEX CORPORATION, OF CHICAGO, ILLINOIS.

MOTOR-VEHICLE LOCK.

1,333,581.   Specification of Letters Patent.   Patented Mar. 9, 1920.

Application filed October 27, 1919. Serial No. 333,475.

*To all whom it may concern:*

Be it known that I, JOSEPH DE MARTINO, a subject of the King of Italy, residing at Chicago, in the county of Cook and State of Illinois, have invented certain new and useful Improvements in Motor-Vehicle Locks, of which the following is a specification.

This invention relates to means for locking motor vehicles so that they can not be readily driven and is particularly applicable to the steering wheel.

The objects of this invention are to provide means which may be readily applied to various forms of automobiles or motor vehicles, to lock the same to prevent unauthorized driving thereof; to provide means whereby the steering wheel may be locked out of operative engagement with the steering post; and in general to provide such an improved locking device as will be described more fully hereinafter.

In the accompanying drawing illustrating this invention:

Figure 1 is a longitudinal sectional view;

Fig. 2 is a cross section taken on line 2—2 of Fig. 1;

Fig. 3 is a cross section taken on the line 3—3 of Fig. 1; and

Fig. 4 is a detail of the locking bushing.

As shown in these drawings, 5, represents the steering column commonly employed in various makes of automobiles and 6 is the rotatable shaft for operating the steering mechanism. The steering wheel 7 is commonly attached directly to the shaft and held against rotation by means of splines 8 or the like.

In accordance with this invention, I remove the steering wheel and replace the same by a collar 9 which has key-ways for engagement with the splines 8 so that it can not be rotated on the shaft. This collar is further held by means of a nut 10 on the threaded end of the shaft 6. The lower portion of the collar 9 has outwardly extending lugs or projections 11, the outer edges of these projections being threaded for engagement by a threaded cap 12.

A cylindrical sleeve or wheel supporting member 13 fits within the cap 12 and has slidable and rotatable engagement with the collar 9. The sleeve 13 has an upwardly extending stem 14 which is preferably formed integrally therewith and is provided with splines 15 corresponding with the splines 8 so that the wheel 7 may be fitted over the stem and will be prevented from rotating thereon. The wheel is held by means of a nut 16 on the threaded end 17 of the stem 14.

The sleeve or wheel supporting member 13 has one or more downwardly extending teeth or projections 18 which are adapted to fit in between the projections 11 on the collar 9. The sleeve 13 is also provided with two annular peripheral grooves 19 and 20 which are adapted to be engaged by a locking bolt 21, this bolt being cut away at 22 so that when it is turned in one position, the sleeve 13 may slide freely in the cap 12. The bolt 21 is provided with any ordinary or preferred lock 23 by means of which it may be locked in adjusted position. The sleeve 13 has a shoulder 24 at its upper end which engages with a flange 25 on the cap 12 so that the sleeve can not be withdrawn from the cap.

The steering wheel 7 is shown in Fig. 1 in raised position, in which position it is disengaged from the shaft 6 so that it may be freely rotated but can not be used for steering the vehicle as the sleeve 13 is out of operative relation with the collar 9. When it is desired to return the same to normal position, the bolt 21 is turned so as to permit the sleeve 13 to slide downwardly whereby the teeth or projections 18 will engage with the teeth or projections 11. The bolt 21 may then be turned to engage with the groove 19 to lock the wheel in operative position.

It will be seen that, by means of this arrangement, I provide a simple attachment which may be readily applied to many types of motor vehicles without changing or altering any of the standard parts of the steering mechanism of such vehicles. Furthermore, the device may be made very compact and strong so that it can not be forced into operative position without substantially destroying the same.

Having thus described my invention, what I claim and desire to secure by Letters Patent is:

1. The combination with the steering shaft of a motor vehicle, of a collar adapted to engage the steering post having radial projections, a cap engaging with said projections, a cylindrical sleeve fitting between the cap and collar and having teeth for engagement with said projections, a stem on said sleeve and means for securing the steering wheel to said stem.

2. An automobile locking device comprising a collar adapted to engage with the steering post and having one or more outwardly extending projections, a cap engaging with said projections, a cylindrical sleeve fitting between the cap and collar and having teeth for engagement with said projections, a stem extending upwardly from said sleeve and adapted to receive the steering wheel, said sleeve having two annular peripheral grooves, a locking bolt mounted in said cap and adapted to engage with said grooves for locking the sleeve in operative and non-operative positions.

3. In an automobile lock, the combination with the usual steering post, of a collar secured to the upper end of the post in the place of the steering wheel, said collar having outwardly extending projections at its lower end, a cap having threads for engagement with the correspondingly threaded portions of said projections and having a flange at its upper end, a cylindrical member fitting between the cap and collar and having projections adapted to engage with the projections on the collar when said member is in lowered position, said sleeve having an integrally formed stem corresponding with the upper end of the steering post, a steering wheel engaging with said stem, means for holding the wheel in fixed position thereon, and means for locking the sleeve in raised or lowered position.

4. The combination with the steering post of an automobile, of a collar adapted to replace the usual steering wheel, means for holding the collar in fixed position, said collar having radical projections at its lower end, a cap engaging with said projections and having an inwardly projecting flange at its upper end, a sleeve slidably and rotatably fitting between the collar and cap and prevented from removal by said flange, said sleeve having projections for engagement with the projections on the collar when the sleeve is in lowered position but adapted to be disengaged from said projections when the sleeve is in raised position, said sleeve having two peripheral grooves, a rotatable bolt mounted in said cap and adapted to engage with the grooves for holding the sleeve in raised or lowered position, a lock for said bolt, and a steering wheel carried by said sleeve.

JOSEPH DE MARTINO.